US008794408B2

(12) United States Patent
Itakura

(10) Patent No.: US 8,794,408 B2
(45) Date of Patent: Aug. 5, 2014

(54) DEVICE FOR ABSORBING IMPACT APPLIED TO MOVING BODY

(75) Inventor: Eiji Itakura, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/583,240

(22) PCT Filed: Mar. 15, 2010

(86) PCT No.: PCT/JP2010/054347
§ 371 (c)(1),
(2), (4) Date: Sep. 7, 2012

(87) PCT Pub. No.: WO2011/114426
PCT Pub. Date: Sep. 22, 2011

(65) Prior Publication Data
US 2013/0037358 A1    Feb. 14, 2013

(51) Int. Cl.
*F16F 7/12*    (2006.01)
(52) U.S. Cl.
USPC ............ 188/371; 267/131; 267/142; 180/271
(58) Field of Classification Search
USPC ................... 267/118, 119, 130, 131, 142; 244/100 A; 180/271; 188/371
See application file for complete search history.

(56) References Cited

U.S. PATENT DOCUMENTS

| | | | |
|---|---|---|---|
| 4,593,870 A | 6/1986 | Cronkhite et al. | |
| 5,815,846 A | 10/1998 | Calonge | |
| 6,490,936 B1 * | 12/2002 | Fortune et al. | 73/862.581 |
| 7,059,446 B2 * | 6/2006 | Murphy et al. | 180/273 |
| 7,232,001 B2 * | 6/2007 | Hakki et al. | 180/271 |
| 7,954,752 B2 * | 6/2011 | Smith et al. | 244/17.17 |
| 8,348,192 B2 * | 1/2013 | Tho et al. | 244/100 A |

FOREIGN PATENT DOCUMENTS

| | | |
|---|---|---|
| JP | 8-40306 | 2/1996 |
| JP | 2002-509586 | 3/2002 |
| JP | 2005-271843 | 10/2005 |
| JP | 2006-341651 | 12/2006 |

OTHER PUBLICATIONS

International Search Report in International Application No. PCT/JP2010/054347; Mailing Date: Apr. 13, 2010.

* cited by examiner

*Primary Examiner* — Christopher Schwartz
(74) *Attorney, Agent, or Firm* — Finnegan, Henderson, Farabow, Garrett & Dunner, LLP

(57) ABSTRACT

There is provided a device for absorbing impact applied to a moving body that can exhibit high impact absorption performance in various collision aspects when a moving body collides with an obstacle or the like.
A bladder 10 is provided on the back surface of a front portion of a high-strength frame 2 of an airplane M1. The bladder 10 includes first and second sealing members 11 and 12 that are formed of elastic bag bodies in which a lubricant is sealed. When an obstacle X collides with the bladder 10, the lubricant S generates pressure, which is substantially uniform and perpendicular to boundary surfaces of the first and second sealing members 11 and 12, on the basis of Pascal's principle, and transmits the pressure. Accordingly, when the airplane M1 collides with the obstacle X, high impact absorption performance is exhibited in various collision aspects.

7 Claims, 4 Drawing Sheets

DEVICE FOR ABSORBING IMPACT APPLIED TO MOVING BODY

CROSS-REFERENCE TO RELATED APPLICATIONS

This application is a national phase application of International Application No. PCT/JP2010/054347, filed Mar. 15, 2010, the content of which is incorporated herein by reference.

TECHNICAL FIELD

The present invention relates to a device for absorbing impact applied to a moving body, and more particularly, to a device for absorbing impact applied to a moving body that is provided on a moving body such as an airplane.

BACKGROUND ART

There is an impact absorbing device that absorbs impact when a moving body such as an airplane collides with an obstacle. In the past, an impact resistant structure of an airplane disclosed, for example, in Patent Literature 1 has been disclosed as such an impact absorbing device. The impact resistant structure of an airplane includes first and second underfloor beams that are provided on the bottom of the fuselage of the airplane and extend in directions crossing each other. Further, an impact absorber, which is made of a fiber-reinforced composite material, is provided at the crossing portion between these beams, and the first and second beams are connected to each other by the impact absorber.

Furthermore, in the impact resistant structure of an airplane disclosed in Patent Literature 1, the crossing portion between the first and second underfloor beams is a portion on which a compressive load is concentrated at the time of the crash. For this reason, it is possible to ensure structural continuity at the crossing portion between the first and second underfloor beams, and to more effectively absorb the energy of a compressive load, which is generated at the time of the crash, through crushing.

CITATION LIST

Patent Literature

[Patent Literature 1] Japanese Unexamined Patent Application Publication No. 2006-341651

SUMMARY OF INVENTION

Technical Problem

However, when an airplane collides with an obstacle, a collision load is concentrated on the crossing portion between the first and second underfloor beams through the first and second underfloor beams in the impact absorber of an airplane disclosed in Patent Literature 1. For this reason, it was not possible to exhibit sufficient impact absorption performance on the bottom of the airplane at a position where the first underfloor beam or the second underfloor beam is not disposed. Accordingly, there was a possibility that impact absorption performance can be further improved in all collision aspects of a moving body such as an airplane.

Accordingly, an object of the invention is to provide a device for absorbing impact applied to a moving body that can exhibit high impact absorption performance in various collision aspects when the moving body collides with an obstacle or the like.

Solution to Problem

In order to achieve the above-mentioned object, according to an aspect of the invention, there is a provided a device for absorbing impact applied to a moving body that is provided in a moving body including a structural member and makes an impact force be absorbed in the structural member when an obstacle collides with the moving body. The device includes a fluid structural member that is formed by sealing fluid in a closed space structure. The fluid structural member is disposed at an impact absorbing position in the moving body, and the fluid structural member is supported by a support member that is connected to the structural member.

In the device for absorbing impact applied to a moving body according to the aspect of the invention, the fluid structural member is disposed at the impact absorbing position in the moving body and the fluid structural member is supported by the support member that is connected to the structural member. For this reason, when an obstacle or the like collides with the fluid structural member that is disposed at the impact absorbing position in the moving body, the fluid of the fluid structural member is moved into the closed space structure and generates pressure, which is substantially uniform and perpendicular to the boundary surface of the closed space structure, on the basis of Pascal's principle, and transmits the pressure. Accordingly, when the moving body collides with an obstacle or the like, high impact absorption performance can be exhibited in various collision aspects.

Here, an impact absorbing member may be interposed between the fluid structural member and the support member.

Since the impact absorbing member is interposed between the fluid structural member and the support member as described above, it is possible to effectively utilize the impact absorbing member. For this reason, it is possible to reduce the burden of a load applied to the fluid structural member.

Further, the fluid structural member may include a load input section that is disposed at an outer position of the moving body at the impact absorbing position, and a load transmission section that is disposed in the moving body on the inside of the load input section. The load input section and the load transmission section may communicate with each other through fluid passages, and the load input section may be formed so as to be separated from the load transmission section.

Since the load input section that is disposed at the outer position of the moving body and the load transmission section that is disposed in the moving body on the inside of the load input section are provided as described above, it is possible to preferably transmit an external load, which is input to the moving body by the collision with an obstacle or the like, to a predetermined position in the moving body, for example, a high-strength member or the like. Accordingly, since it is possible to preferably transmit the input load to the high-strength member, it is possible to further increase impact absorption performance.

Advantageous Effects of Invention

According to a device for absorbing impact applied to a moving body of the invention, it is possible to exhibit high impact absorption performance in various collision aspects when a moving body collides with an obstacle or the like.

DESCRIPTION OF EMBODIMENTS

Figure 1:
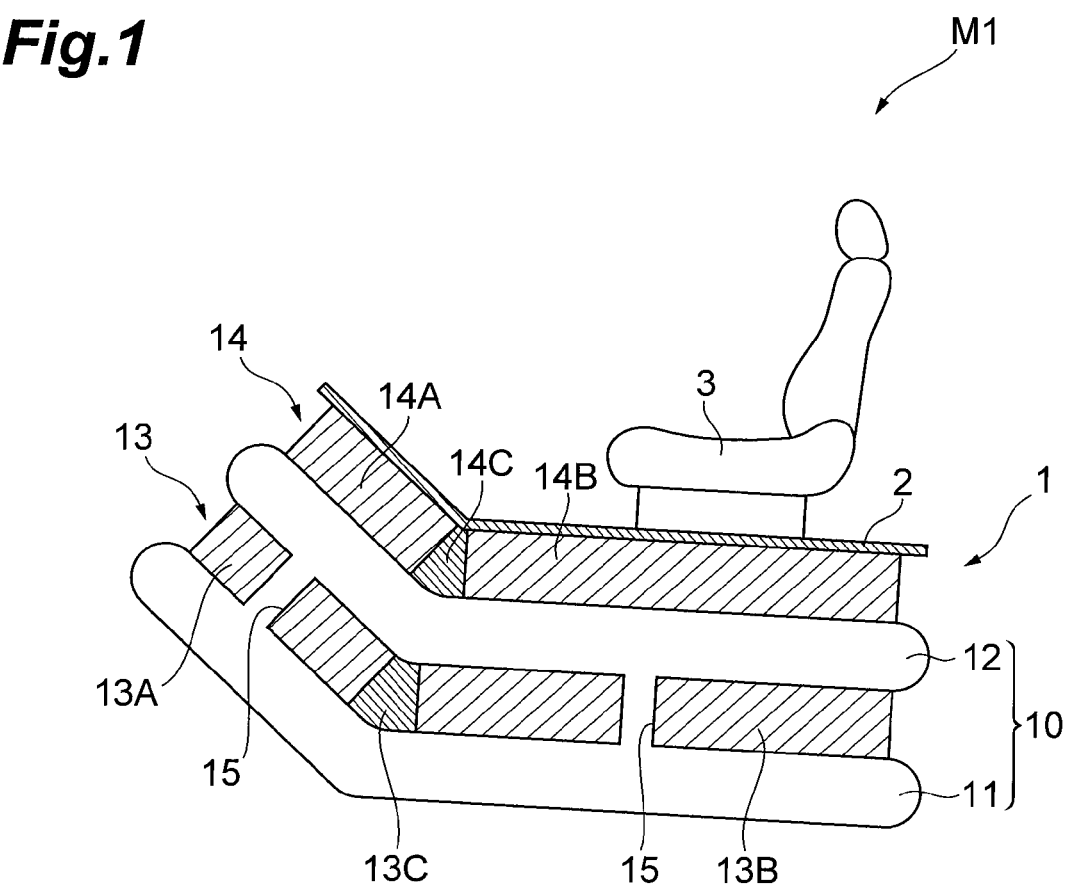
FIG. 1 is a sectional side view of a main part of an airplane that includes a device for absorbing impact applied to a moving body according to a first embodiment.

Embodiments of the invention will be described below with reference to the accompanying drawings. Meanwhile, the same elements in the description of the drawings are denoted by the same reference numerals, and the repeated description thereof will be omitted. Further, for convenience in the drawings, the scales in the drawings do not necessarily correspond to scales in the description.

A first embodiment of the invention will be described first. FIG. 1 is a sectional side view of a main part of an airplane that includes a device for absorbing impact applied to a moving body according to a first embodiment. As shown in FIG. 1, the device 1 for absorbing impact applied to a moving body is provided in an airplane M1. The airplane M1 includes a high-strength frame 2 that is a structural member of the invention, and a cockpit 3 is provided on the upper surface of the high-strength frame 2. The device 1 for absorbing impact applied to a moving body is provided at the position, where the cockpit 3 is provided, on the back surface of the high-strength frame 2 that is an impact absorbing position of the invention.

The device 1 for absorbing impact applied to a moving body includes a bladder 10 that is a fluid structural member formed by sealing fluid in a closed space structure. The bladder 10 includes first and second sealing members 11 and 12. Each of the sealing members 11 and 12 is an elastic bag body, and a lubricant is sealed in each of the sealing members 11 and 12. The first and second sealing members 11 and 12 are formed to be separated from each other.

The bladder 10 absorbs a load that is generated by collision with an obstacle, and transmits the load to the high-strength frame 2. The first sealing member 11 of the bladder 10 functions as a load input section of the invention, and the second sealing member 12 functions as a load transmission section of the invention. Further, the front portion of the bladder 10 is inclined downward toward the rear when the airplane M1 is horizontal. Meanwhile, the rear portion of the bladder 10 is substantially horizontal when the airplane M1 is horizontal.

Furthermore, a first energy absorbing material (hereinafter, referred to as an "EA material") layer 13, which is an impact absorbing member of the invention, is interposed between the first and second sealing members 11 and 12 of the bladder 10, and a second EA material layer 14 is interposed between the second sealing member 12 and the high-strength frame 2. Each of the first and second EA material layers 13 and 14 is formed of, for example, an elastic body, and absorbs impact at the time of the collision of the airplane M1.

Further, the first EA material layer 13 includes a front member 13A that is positioned at the front portion of the airplane M1, a rear member 13B that is positioned at the rear portion thereof, and an intermediate member 13C that is positioned between the front and rear members 13A and 13B. Furthermore, likewise, the second EA material layer 14 also includes a front member 14A, a rear member 14B, and an intermediate member 14C. The second EA material layer 14 is connected to the high-strength frame 2 with the second sealing member 12 of the bladder 10 interposed therebetween, and functions as a support member of the invention.

A plurality of fluid passages 15 are formed in the front and second members 13A and 13B of the first EA material layer 13. The first and second sealing members 11 and 12 communicate with each other through these fluid passages 15. The lubricant, which is sealed in each of the first and second sealing members 11 and 12, can flow between the first and second sealing members through the fluid passages 15. Inner portions of the first and second sealing members 11 and 12 form a closed space where the transmission of fluid pressure based on Pascal's principle occurs.

Figure 2:
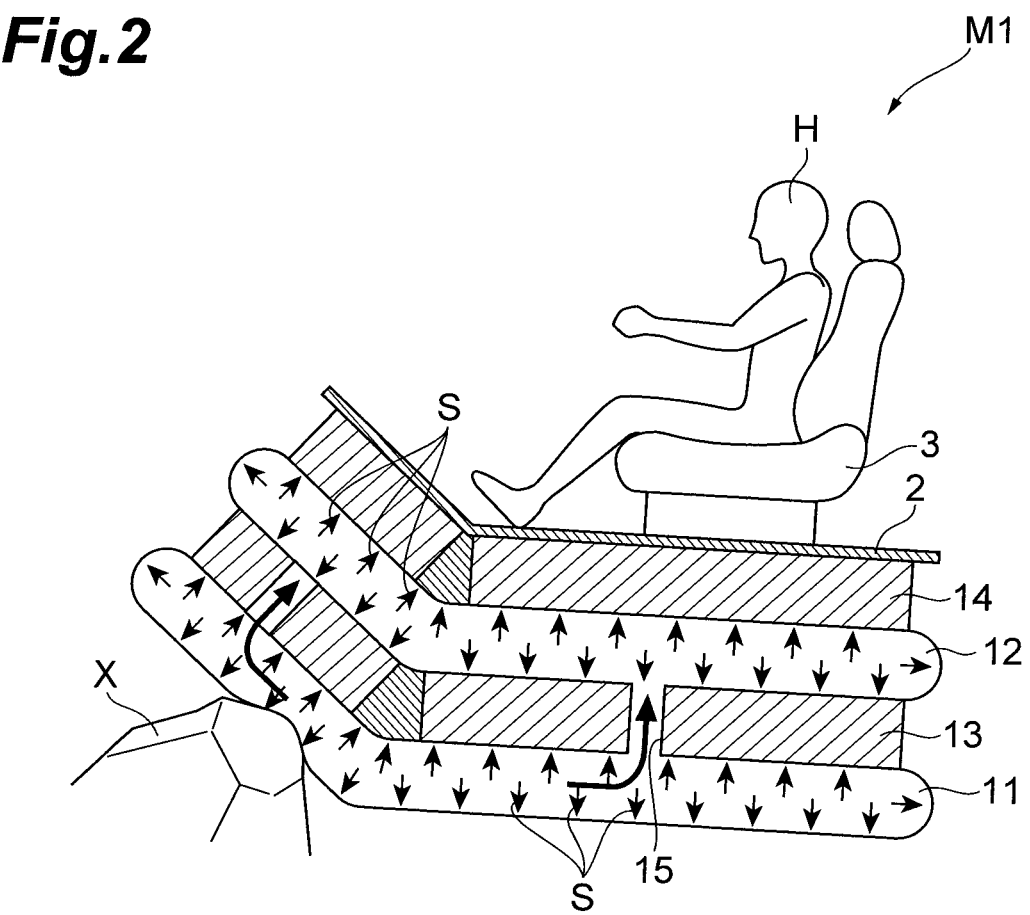
FIG. 2 is a view illustrating the flow of a lubricant in a bladder of the first embodiment.

Next, the operation of the device for absorbing impact applied to a moving body according to this embodiment will be described. The device 1 for absorbing impact applied to a moving body according to this embodiment is provided on the bottom of the high-strength frame 2 of the airplane M1. Here, when a pilot H is seated in the cockpit 3 and the airplane M1 collides with an obstacle X such as a rock as shown in FIG. 2, it is supposed that the obstacle X collides with the bladder 10 of the device 1 for absorbing impact applied to a moving body in a local inclination direction.

In this case, as the obstacle X collides with the bladder 10, a portion of the first sealing member 11, which collides with the obstacle, is locally deformed. When the first sealing member 11 is locally deformed, the lubricant S sealed in the first sealing member 11 flows in the first sealing member 11 and also flows into the second sealing member 12 through the fluid passages 15.

At this time, the lubricant S generates pressure, which is substantially uniform and perpendicular to the boundary surface of the first sealing member 11, in the first sealing member 11 on the basis of Pascal's principle, and transmits the pressure. Further, the lubricant S, which has flowed into the second sealing member 12 through the fluid passages 15, also generates a load, which is substantially uniform and perpendicular to the boundary surface of the second sealing member 12, and transmits the load.

The load, which is transmitted in the first sealing member 11, is uniformly applied to the first EA material layer 13 so as to be perpendicular to the first EA material layer 13. Further, the load, which is transmitted in the second sealing member 12, is uniformly applied to the second EA material layer 14 so as to be perpendicular to the second EA material layer 14. For this reason, a break occurs in efficient load boundary conditions of the first and second EA material layers 13 and 14. Accordingly, even when collision locally occurs on the bladder 10, the bladder can effectively absorb the impact as a whole.

Further, a case where the obstacle X collides with the bladder 10 from the front in the local inclination direction has been supposed in the embodiment shown in FIG. 2. However, even though an obstacle collides with any portion of the bladder 10, a load, which is substantially uniform and perpendicular to the boundary surfaces of the sealing members 11 and 12, is generated on the basis of Pascal's principle and transmitted. Accordingly, when the airplane M1 collides with the obstacle X, high impact absorption performance can be exhibited in various collision aspects.

Furthermore, the front portion of the bladder 10 is inclined downward toward the rear. Since the front portion of the bladder 10 is inclined as described above, among load components in the inclination direction generated at the time of collision, a perpendicular component can generate fluid pressure and a parallel component can cause deformation or surface slippage of the bladder 10.

Moreover, when the bag bodies of the bladder 10 are broken by the collision with the obstacle X, the lubricant contained in the bag bodies flows out. Since the lubricant flows out from the bag bodies in this case, the bladder 10 can be lubricated with fluid on the ground or the EA material layers 13 and 14. In addition, even when breaking of the EA material layers 13 and 14 does not occur, a load is uniformly applied to the high-strength frame 2 so as to be perpendicular to the high-strength frame 2. For this reason, it is possible to reduce strength burden of the high-strength frame 2 against an input load. Accordingly, it is possible to reduce the weight of the high-strength frame 2.

Figure 3:
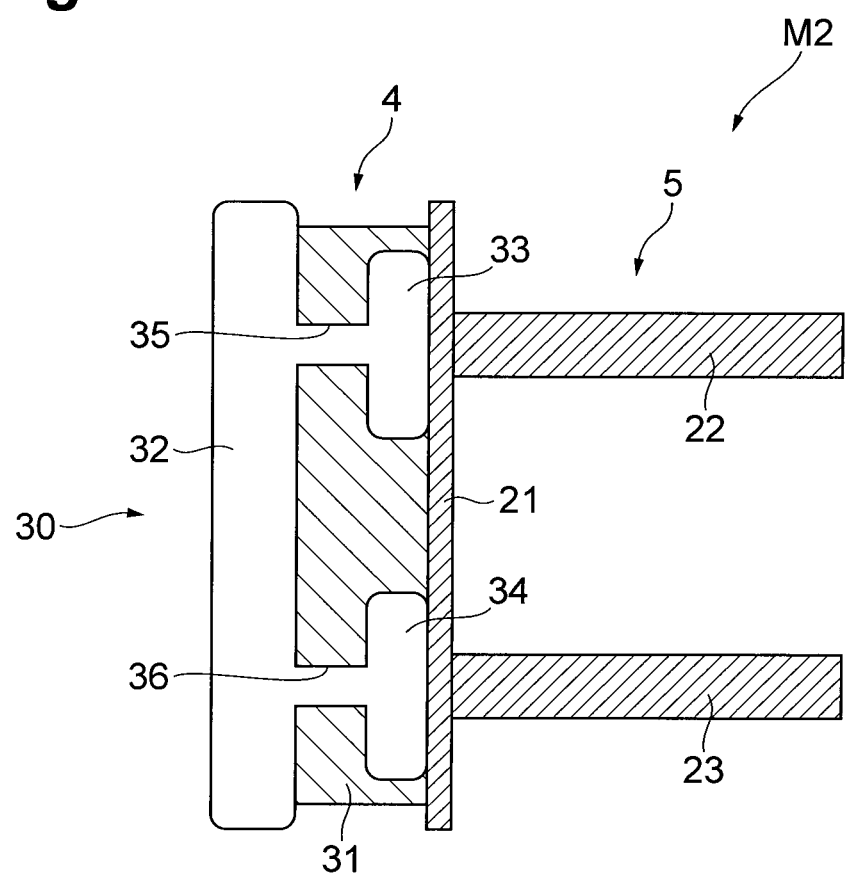
FIG. 3 is a plan cross-sectional view of the main parts of a vehicle that includes a device for absorbing impact applied to a moving body according to a second embodiment.

Next, a second embodiment of the invention will be described. FIG. 3 is a plan cross-sectional view of the main parts of a vehicle that includes a device for absorbing impact applied to a moving body according to a second embodiment. As shown in FIG. 3, a device 4 for absorbing impact applied to a moving body according to this embodiment is provided in a vehicle M2. The vehicle M2 includes a frame member 5. The frame member 5 includes a lateral frame 21 that is disposed at the front portion and extends in the width direction, and longitudinal frames 22 and 23 that are connected to both ends of the lateral frame 21 and extend in the longitudinal direction. Each of the lateral frame 21 and the longitudinal frames 22 and 23 is formed of a high-strength frame.

Further, the device 4 for absorbing impact applied to a moving body is provided at the front end of the lateral frame 21 of the frame member 5 that which is an impact absorbing position of the invention. The device 4 for absorbing impact applied to a moving body includes a bladder 30 that is a support member of the invention. The bladder 30 includes a bladder holder 31 that is a support member of the invention. A first sealing member 32, a second sealing member 33, and a third sealing member 34 are held by bladder holder 31.

The first sealing member 32, the second sealing member 33, and the third sealing member 34 include elastic bag bodies in which a lubricant is sealed as in the first embodiment. Furthermore, the first sealing member 32 corresponds to a load input section of the invention, and the second and third sealing members 33 and 34 correspond to a load transmission section of the invention.

The bladder holder 31 is provided in front of the lateral frame 21 of the frame member 5. The first sealing member 32 is mounted on the front end portion of the bladder holder 31. The first sealing member 32 is disposed at the foremost end of the vehicle M2, and is formed so as to extend in a lateral direction. The length of the first sealing member 32 in the width direction of the vehicle is substantially the same as the length of the lateral frame 21 of the frame member 5 in the width direction of the vehicle.

Recesses are formed at the right rear portion of the bladder holder 31 in front of the right longitudinal frame 22 of the frame member 5 and at the left rear portion of the bladder holder 31 in front of the left longitudinal frame 23 of the frame member 5. The second and third sealing members 33 and 34 are accommodated in these recesses, respectively.

The second and third sealing members 33 and 34 are provided adjacent to the front portion of the lateral frame 21 of the frame member 5. Among them, the second sealing member 33 is disposed at a position in front of the right longitudinal frame 22 of the frame member 5 at the right end portion of the vehicle M2. Further, the third sealing member 34 is disposed at a position in front of the left longitudinal frame 23 of the frame member 5 at the left end portion of the vehicle M2. The sizes of the second and third sealing members 33 and 34 are equal to each other and are smaller than the size of the first sealing member 32.

Furthermore, first and second fluid passages 35 and 36 are formed in the bladder holder 31. The first fluid passage 35 makes the first and second sealing members 32 and 33 communicate with each other, and the second fluid passage 36 makes the first and third sealing members 32 and 34 communicate with each other. The lubricant, which is sealed in each of the first, second, and third sealing members 32, 33, and 34, can flow among the first, second, and third sealing members 32, 33, and 34 through the fluid passages 35 and 36, respectively. Inner portions of the first, second, and third sealing members 32, 33, and 34 form a closed space where the transmission of fluid pressure based on Pascal's principle occurs.

Next, the operation of the device for absorbing impact applied to a moving body according to this embodiment will be described. The device 4 for absorbing impact applied to a moving body according to this embodiment is provided at the front end portion of the frame member 5 of the vehicle M2. Here, when the vehicle M2 collides with an obstacle X such as a sign or a pole, it is supposed that the obstacle X locally collides with the bladder 30 of the device 4 for absorbing impact applied to a moving body.

In this case, as the obstacle X collides with the bladder 30, a portion of the first sealing member 32, which collides with the obstacle, is locally deformed. When the first sealing member 32 is locally deformed, the lubricant S sealed in the first sealing member 32 flows in the first sealing member 32, flows into the second sealing member 33 through the first fluid passage 35, and also flows into the third sealing member 34 through the second fluid passage 36.

At this time, the lubricant S generates pressure, which is substantially uniform and perpendicular to the boundary surface of the first sealing member 32, in the first sealing member 32 on the basis of Pascal's principle, and transmits the pressure. Further, the lubricant S that has flowed into the second sealing member 33 through the first fluid passage 35 and the lubricant S that has flowed into the third sealing member 34 through the second fluid passage 36 also generate a load, which is substantially uniform and perpendicular to the boundary surfaces of the second and third sealing members 33 and 34, and transmit the load.

The load, which is transmitted in the second sealing member 33, becomes a load F that is uniformly applied to the right longitudinal frame 22 of the frame member 5 so as to be perpendicular to the right longitudinal frame 22. Likewise, the load, which is transmitted in the third sealing member 34, becomes a load F that is uniformly applied to the left longitudinal frame 23 so as to be perpendicular to the left longitudinal frame 23. For this reason, it is possible to effectively transmit a load to the right and left longitudinal frames 22 and 23. As a result, it is possible to efficiently bear the load, which is generated by the collision, by the right and left longitudinal frames 22 and 23 that are formed of high-strength frames. Accordingly, even when collision locally occurs on the bladder 30, it is possible to effectively absorb the impact as a whole.

Figure 4:
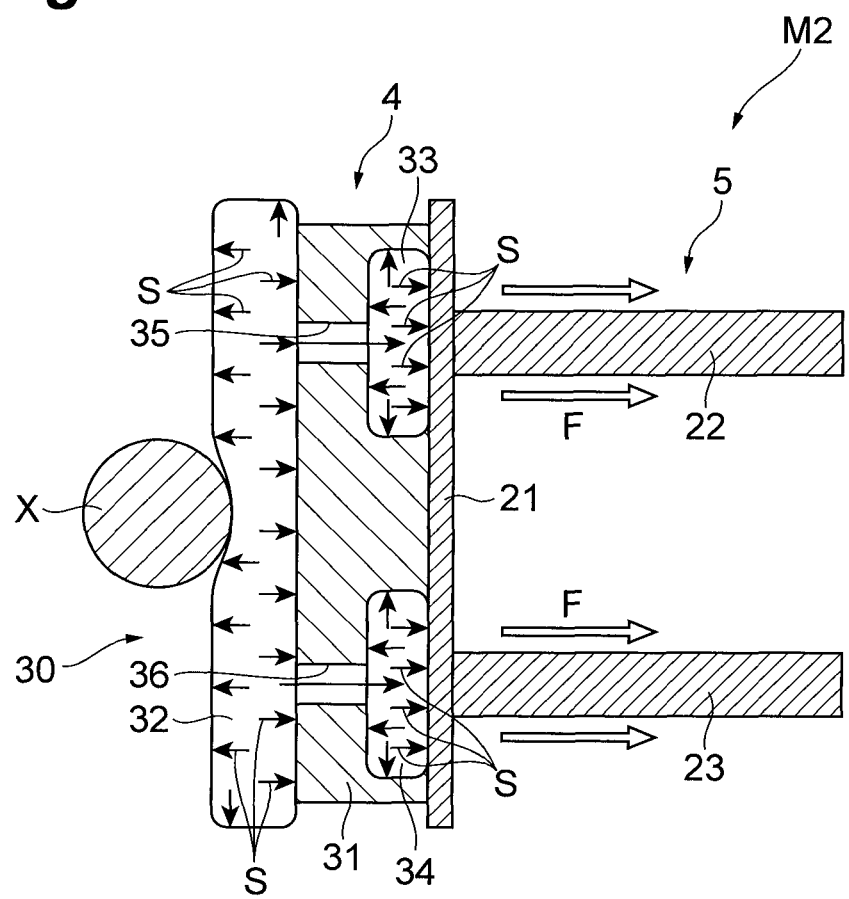
FIG. 4 is a view illustrating the flow of a lubricant in a bladder of the second embodiment.

Moreover, a case where the obstacle X collides with the bladder 30 from the front of the bladder 30 has been supposed in the embodiment shown in FIG. 4. However, even though an obstacle collides with any portion of the bladder 30, a load, which is substantially uniform and perpendicular to the boundary surfaces of the sealing members 32, 33, and 34, is generated on the basis of Pascal's principle and transmitted. Accordingly, since a mode where a load is input to the right and left longitudinal frames 22 and 23 becomes constant, high impact absorption performance can be exhibited in various collision aspects when the vehicle M2 collides with the obstacle X.

Further, when the obstacle X collides with the bladder 30 in the inclination direction, a load component in the inclination direction is generated. Among load components in the inclination direction that are generated at this time, a perpendicular component can generate fluid pressure and a parallel component can cause deformation or surface slippage of the bladder 30. Furthermore, when the bag bodies of the bladder 30 are broken by the collision with an obstacle X, the lubricant contained in the bag bodies flows out. Since the lubricant flows out from the bag bodies in this case, the bladder 30 can be lubricated with fluid on the ground or the obstacle X.

The preferred embodiments of the invention have been described above, but the invention is not limited to the above-mentioned embodiments. For example, the lubricant S has been sealed in the bag bodies of the bladders 10 and 30 in the above-mentioned embodiments. However, the lubricant S may be another liquid or gas. Moreover, the EA material layers 13 and 14 have been formed in the first embodiment, but the EA material layer may not be formed.

In addition, the EA material layer is not formed in the second embodiment, but an EA material may be interposed between the bladder holder 31 and the frame member 5 or in the held portions of the sealing members 32, 33, and 34 of the bladder holder 31. Here, when the EA material is to be interposed, a plurality of EA material layers may be formed.

Further, a load is transmitted to the high-strength frame 2 in the first embodiment, and a load is transmitted to the frame member 5 in the second embodiment. In contrast, a load may be transmitted to other portions of the high-strength frame or the frame member of the fuselage of an airplane or a body of a vehicle. Here, when a load is transmitted to the fuselage or the vehicle body, a load may be transmitted to not only one portion but also a plurality of portions of the fuselage or the vehicle body.

Furthermore, it is possible to form the configuration of the bladder in various ways according to a mode where a load is to flow in terms of design. Moreover, it is possible to make a mode constant not only in a local load but also various distribution loads.

INDUSTRIAL APPLICABILITY

The invention relates to a device for absorbing impact applied to a moving body, and, particularly, can be used for a device for absorbing impact applied to a moving body that is provided on a moving body such as an airplane.

REFERENCE SIGNS LIST

1: device for absorbing impact applied to moving body
2: high-strength frame
3: cockpit
4: device for absorbing impact applied to moving body
5: frame member
10: bladder
11: first sealing member
12: second sealing member
13: first EA material layer
14: second EA material layer
15: fluid passage
21: lateral frame
22: right longitudinal frame
23: left longitudinal frame
30: bladder
31: bladder holder
32: first sealing member
33: second sealing member
34: third sealing member
35: first fluid passage
36: second fluid passage
F: load
H: pilot
M1: airplane
M2: vehicle
S: lubricant
X: obstacle

The invention claimed is:

1. A device for absorbing impact applied to a moving body including a structural portion that absorbs an impact force when an obstacle collides with the moving body, the device comprising:
    a fluid structural member that is formed by sealing fluid in a closed space structure,
    wherein the fluid structural member is disposed at an impact absorbing position of the moving body,
    the fluid structural member is supported by a support member that is connected to the structural portion,
    the fluid structural member includes a load input section that is disposed at an outer position of the moving body at the impact absorbing position, and a load transmission section that is disposed in the moving body on the inside of the load input section,
    the load input section and the load transmission section communicate with each other through fluid passages, and
    the load input section is formed so as to be separated from the load transmission section.

2. The device according to claim 1,
    wherein the moving body is an airplane.

3. The device according to claim 2,
    wherein a front portion of the fluid structural member is inclined downward toward the rear side when the airplane is horizontal, and a rear portion of the fluid structural member is horizontal when the airplane is horizontal.

4. The device according to claim 2,
    wherein the fluid structural member is disposed on the bottom of the airplane.

5. The device according to claim 1,
    wherein lubricant is sealed in the fluid structural member as the fluid.

6. The device according to claim 1,
    wherein the fluid structural member is provided at an impact absorbing position on the outside of the moving body where the obstacle directly collides.

7. The device according to claim 1,
    wherein the fluid structural member is disposed at a front portion of a vehicle.

* * * * *